May 13, 1958 D. B. ROY, SR., ET AL 2,834,492
BOAT TRAILER
Filed March 7, 1956 3 Sheets-Sheet 1
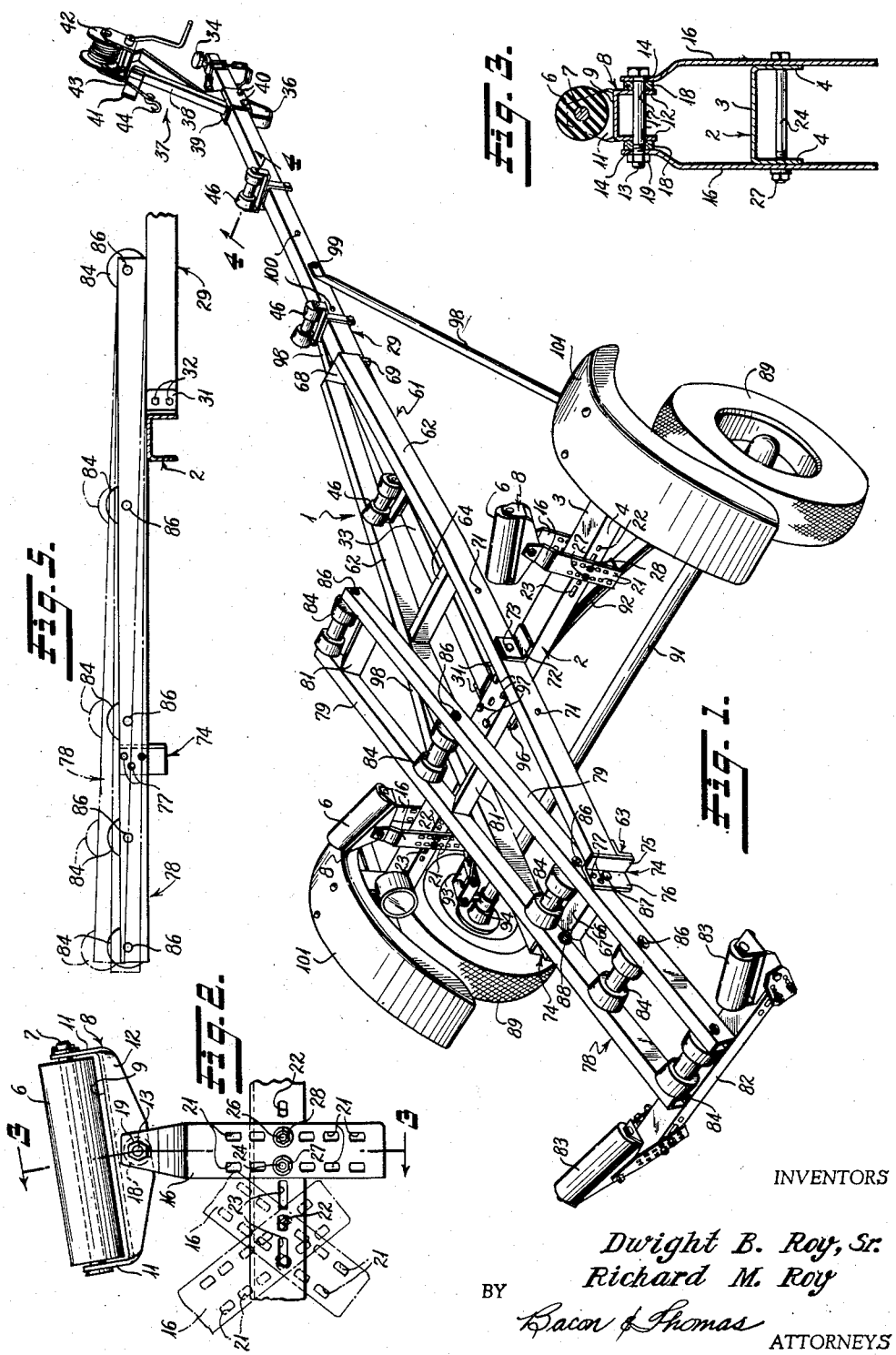
INVENTORS
Dwight B. Roy, Sr.
Richard M. Roy
BY
Bacon & Thomas
ATTORNEYS

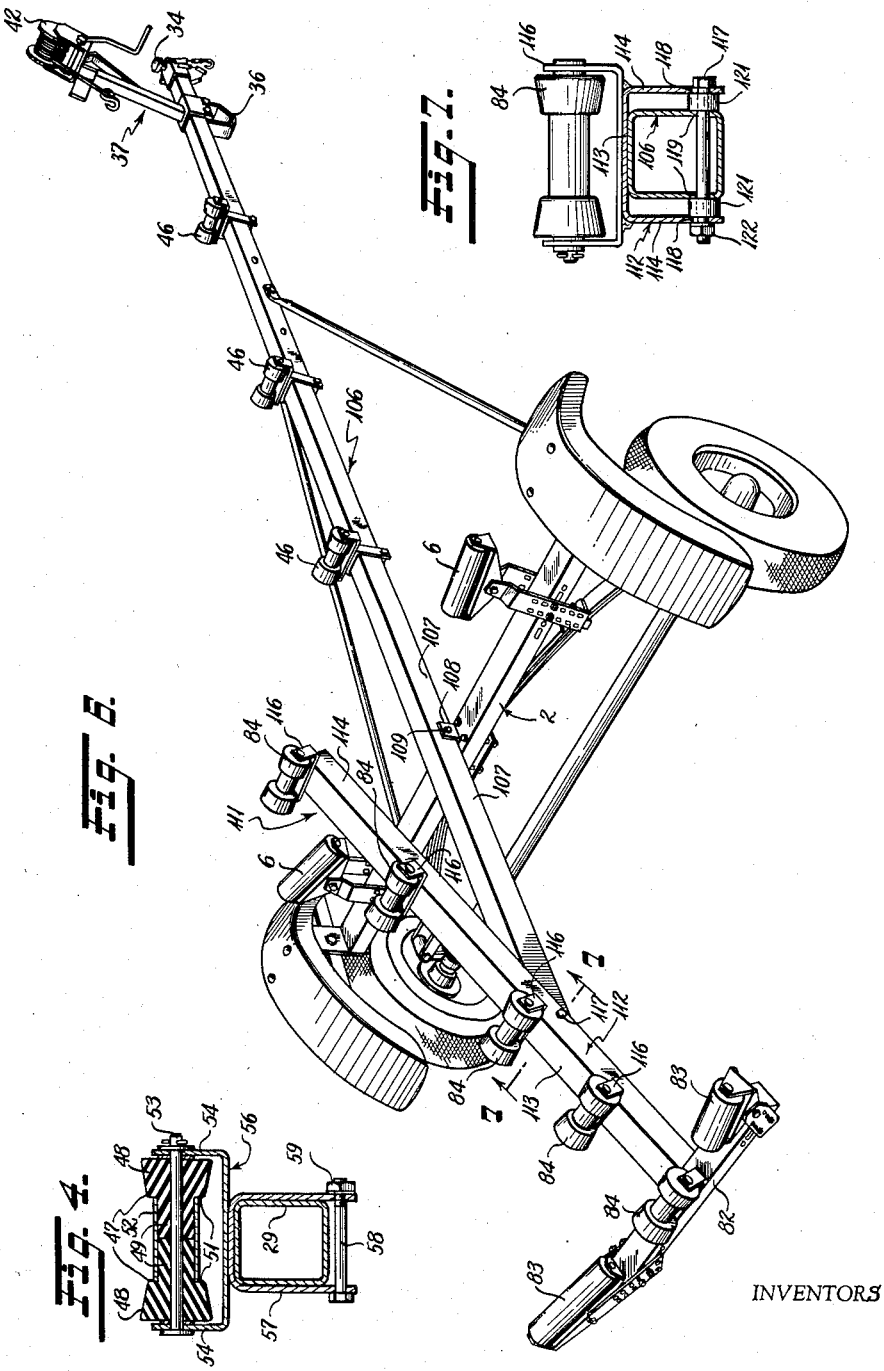

INVENTORS
Dwight B. Roy, Sr.
Richard M. Roy
BY Bacon & Thomas
ATTORNEYS

United States Patent Office 2,834,492
Patented May 13, 1958

2,834,492

BOAT TRAILER

Dwight B. Roy, Sr., and Richard M. Roy, Wethersfield, Conn., assignors to Mastercraft Trailers, Inc., Middlesex, Conn., a corporation Application March 7, 1956, Serial No. 570,028

18 Claims. (Cl. 214—505)

The present invention relates to a boat trailer and, more particularly, to a trailer for handling outboard motor boats.

The use of outboard motor boats, including those of the runabout type, has grown tremendously in recent years and along with this growth has arisen the need for vehicles which will transport the boats swiftly and safely to and from waterways on which the boats are to be used. Also, it is highly advantageous that the trailer be constructed for loading and launching a boat with a minimum of effort.

Accordingly, it is a primary object of the present invention to provide a trailer for the unassisted loading and launching of an outboard motor boat by one person and while the trailer is still attached to the car or completely detached therefrom.

Another object of the invention is to provide a boat trailer constructed so that the loading operation may include an initial vertical lifting of the bow of the boat.

Still another object of the invention is to provide a boat trailer having boat loading and launching means which maintains the boat in alignment with the trailer during the entire loading or launching operation even if there is a current or the water is rough.

A further object of the invention is to provide a boat trailer the main framework of which is longitudinally adjustable to accommodate boats of different lengths.

Still another object of the invention is to provide a boat trailer upon which boats of different lengths may be properly balanced with their weight evenly distributed over a plurality of bearing points.

Yet another object of the invention is to provide a boat trailer upon which the transom of the boat is directly supported and on which an outboard motor boat may be loaded, transported and launched without removing the outboard motor from the boat.

Another and further object of the invention is to provide a boat trailer which affords full, evenly distributed support to the keel of the boat, even if the keel of the boat inclines upwardly or downwardly from the horizontal toward the transom.

A still further object of the invention is to provide a boat trailer adapted to transport a boat on long, hard trips over rough roads at high speeds.

Another object of the present invention is to provide a boat trailer which is rugged and sturdy but of pleasing appearance and relatively economical to build.

Other and further objects will be apparent from the following detailed description of the invention taken in conjunction with the drawings, in which Fig. 1 is a perspective view of a boat trailer constructed in accordance with the present invention;

Fig. 2 is an enlarged fragmentary elevational view showing in detail the mounting of one of the adjustable rollers which contacts the bottom of a boat in an area spaced laterally from the keel;

Fig. 3 is a sectional view taken on the line 3—3 of Fig. 2;

Fig. 4 is an enlarged sectional view taken on the line 4—4 of Fig. 1 showing in detail one of the keel supporting and guiding rollers;

Fig. 5 is a diagrammatic elevational view, partly in section, of the lifting, loading and launching ramp showing the manner in which it may be adjusted to fully support boat keels which incline in varying degrees upwardly from the horizontal toward the transom of the boat;

Fig. 6 is a perspective view of a modified form of boat trailer constructed in accordance with the present invention;

Fig. 7 is an enlarged sectional view taken on the line 7—7 of Fig. 6 looking in the direction of the arrows with the ramp in lowered position.

Figs. 8–11, inclusive, are diagrammatic views showing varying stages of a boat loading operation conducted on a sloping beach using a trailer constructed in accordance with the invention.

Figure 12:
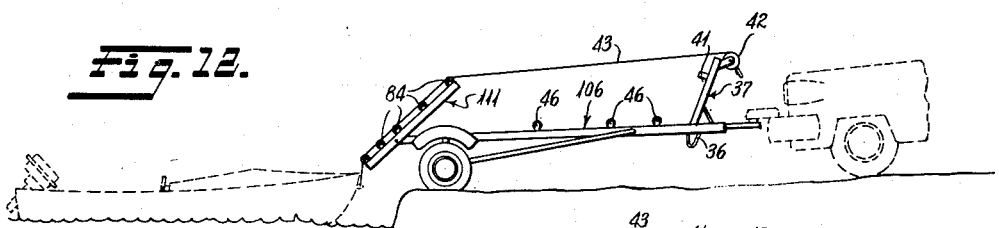
Figure 13:
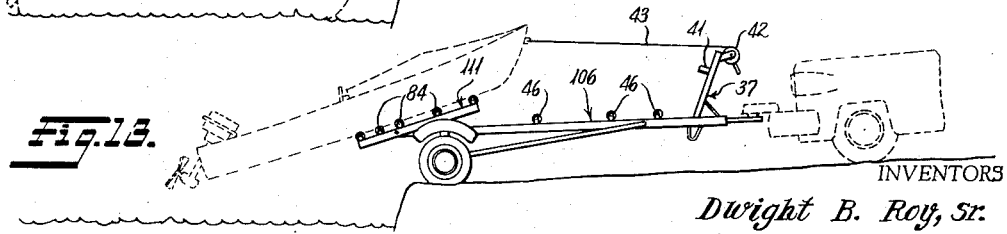

Figs. 12 and 13 are similar views showing how a boat may be loaded over a substantially vertical wall or bank.

Now referring to the modification of the invention illustrated by Fig. 1, the numeral 1 generally designates the longitudinally adjustable frame of the trailer. The frame 1 includes a transverse member 2 which, as shown in Fig. 3 may conveniently comprise a channel of inverted U-shaped form having a platform portion 3 and depending leg portions 4. At spaced points on the transverse member 2 substantially equally distant from each end thereof are mounted a pair of elongated rollers 6 of rubber or similar resilient material rotatable on an axis extending generally longitudinally of the transverse member.

As best shown in Figs. 2 and 3, each roller 6 is mounted on a shaft 7 journaled in a bracket 8 having a base portion 9 provided with upturned end flanges 11 and downturned side flanges 12, the shaft 7 being journaled in the end flanges 11. The bracket 8 is mounted for rocking movement on an axis disposed transversely of the transverse member 2 so as to insure maximum line contact of the surface of the rollers 6 with the bottom of a boat. This is accomplished by passing a bolt 13 through aligned apertures 14 in a pair of links 16 and a pair of aligned apertures 17 in the flanges 12. Friction washers 18 are interposed between the confronting faces of flanges 12 and links 16 so that when a nut 19 is screwed home, the rollers 6, while they will readily align themselves with the bottom of a boat moved thereover, will maintain the position they are in when last contacted by the boat bottom during a launching operation. The importance of this fact will be brought out hereinafter.

So that the rollers 6 may be longitudinally and vertically adjusted with respect to transverse member 2 to accommodate boats having different widths and bottom contours, the roller supporting links 16 are provided with two vertical rows of horizontally aligned apertures 21 and the leg portions 4 of transverse member 2 are provided adjacent each end thereof with a series of apertures 22 and slots 23 with the apertures and slots alternating. Thus, as shown in Fig. 2, an initial setting of rollers 6 longitudinally and vertically with respect to transverse member 2 can be made by passing a bolt 24 through selected ones of the apertures 21 in one of the vertical rows of apertures in the links 16 and through a selected pair of aligned apertures in leg portions 4 of transverse member 2. Then a bolt 26 may be passed through apertures of links 16 in the other vertical row of apertures therein either in horizontal alignment with the selected apertures in the first row or those immediately above or below these apertures and through aligned slots 23 which are elongated sufficiently that the bolt 26 will be received thereby regardless of whether the links 16 are disposed vertically as shown in full lines in Fig. 2 or inclined to either side as shown in broken lines in this same figure. Nuts 27 and 28 may be screwed home on bolts 24 and 26 to maintain links 16 firmly in place in adjusted position.

A boom 29, which as shown in Fig. 4 may conveniently be formed of a rectangular hollow beam, projects forwardly from the transverse beam 2 midway between its ends and is secured thereto by the reception of one end of the boom between forwardly directed plates 31 secured to transverse member 2 as by welding. Bolts 32 may be employed to anchor the boom 29 between plates 31 but it is to be understood that welding or other suitable means may be employed for this purpose. The upper surface 33 of boom 29 will preferably lie in the same plane as the platform portion 3 of transverse member 2.

The forward end of the boom 29 is provided with a conventional hitch device 34 for attaching the trailer to a towing vehicle and beneath the boom 29 adjacent the forward end is mounted a ground rest 36. Also adjacent the forward end of boom 29 is mounted a bow rest 37 which comprises a post 38 extending upwardly and forwardly from a saddle clamp 39 which embraces the boom 29 and is clamped thereon by bolts 40 which pass beneath the boom. A V-shaped support 41 is mounted, preferably so as to be vertically adjustable, adjacent the upper end of post 38 to receive the bow of a boat loaded on the trailer. The bow rest 37 may be adjusted longitudinally of the boom to accommodate boats of different lengths by loosening the bolts 40 and again tightening them when the bow rest is in adjusted position.

A geared hand winch 42 having wound thereon a line 43 may conveniently be mounted at the upper end of bow rest 37 above and behind support 41. The line 43 has a hook 44 secured to its free end for attachment to a ring on the bow of a boat after being trained over the trailer in a manner which will be described hereinafter.

At spaced points along the boom 29 are mounted keel guiding and supporting rollers 46. As shown in Fig. 4, each roller consists of a pair of identical elements 47 of rubber or similar material, each element having a conical portion 48 and a reduced cylindrical portion 49 forming a shoulder 51. The cylindrical portions 49 are received in abutting relation within a tight fitting metal sleeve 52 which protects the underlying rubber by shielding it from direct contact with the keel of a boat. The keel is, however, confined between the shoulders 51 and any contact of the bottom of the boat with the rollers will be with the conical portions 48 of resilient material.

Each of the rollers 46 is mounted on a shaft 53 which is journaled in the upturned flanges 54 of a bracket 56 which may be secured as by welding to a saddle clamp 57. The clamps 57 are releasably secured to the boom 29 by means of bolts 58 and cooperating nuts 59.

In addition to the use of the adjustable bow rest 37, the frame 1 is made adjustable for boats of different lengths by a twin boom structure 61, which includes a pair of rails 62 which may also be of hollow rectangular construction. The rails 62 are substantially parallel between a pair of transverse spacer members 63 and 64. The spacer member 63 may conveniently be formed of a section of angle iron, one leg portion 66 of which is secured to the underside of rail members 62 as by welding so that the other leg portion 67 will be positioned in the same vertical plane as the ends of rails 62. The spacer member 64 may also be of hollow rectangular construction and secured in place between rails 62 as by welding.

The rails 62 converge forwardly of the spacer member 64 and are secured to a plate 68 as by welding. The plate 68 preferably has a forwardly projecting ear portion (not shown) which cooperates with a U-bolt 69, of which a portion only is shown, and which embraces boom 29 to maintain the twin boom structure 61 in position thereon.

Both rails of the parallel rail portion of twin boom structure 61 are provided with a series of aligned apertures 71 (those in the far rail of the structure as viewed in Fig. 1 not being visible) for securing the structure on the transverse member 2 in adjusted position. For this purpose a pair of brackets 72 (the far bracket again not being visible in Fig. 1) are secured in spaced relation on the platform portion 3 of transverse member 2 and a bolt 73 is passed through the bracket and a selected one of the apertures 71 depending on the length of the boat to be transported. However, regardless of the position of the twin boom structure 61 a substantial portion thereof extends rearwardly of the transverse member 2. Also, it should be pointed out that the arrangement is such that a boat carried by the trailer is properly balanced regardless of which of the apertures 71 is employed for securing the twin boom structure on the transverse member 2.

At the rearward end of twin boom structure 61 are mounted, by welding or other suitable means, a pair of brackets 74 including base portions 75 secured to the ends of rails 62 and the rearward face of spacer member 63 and leg portions 76 extending rearwardly normal to base portion 75. A limited portion of each base portion 75 extends inwardly a slight distance from the rail 62 to which it is attached for a reason which will appear later.

Each leg portion 76 of brackets 73 is provided with a plurality of apertures 77 at different levels, but with the apertures in each bracket being similarly located, so that a boat lifting, loading and launching ramp 78, may be pivotally mounted at the rearward end of twin boom structure 61 at a selected level for a reason to be fully set forth hereinafter.

The ramp 78 may comprise a pair of rails 79 in the form of hollow rectangular beams maintained in spaced parallel relation by a pair of transverse members 81 of angle iron welded in place between the rails and a transverse transom support beam 82. The beam 82 may be of hollow rectangular construction and secured to the underside of rails 79 at their rearward end as by welding. Adjacent each end of beam 79 is mounted a roller 83. The structure, arrangement and mounting of the rollers 83 is preferably the same as with the rollers 6 and, accordingly, need not be described in detail here.

Between the rails 79 of ramp 78 are journaled a plurality of keel guiding and supporting rollers 84 which may be identical in construction with the rollers 46. The shafts 86 supporting rollers 84 are rotatably mounted in transversely aligned apertures (not shown) in rails 79 so that a portion of the rollers projects above the upper edges of the rails 79. The rollers are quite closely spaced adjacent the rearward end of ramp 78, whereas they may be more widely spaced toward the forward end. This prevents the bow of a boat from jamming between the two rearwardmost rollers during the initial lifting stage when the ramp 78 is most nearly vertical. Also spaced points on the bow of a boat being loaded will quickly contact at least two of the rollers and this is an important feature of the present invention as will be brought out hereinafter. One of the rollers 84 should be positioned closely adjacent each end of ramp 78 and the roller adjacent the forward end of the ramp serves as a sheave or pulley over which the line 43 is trained and then secured to a ring or other attachment means at the bow of a boat. Another of the rollers 84 should be positioned closely adjacent to and preferably just forwardly of the pivotal axis of the ramp 78 and the reason for this will be brought out in the description of the operation of the trailer which will appear later. The desired spacing of the rollers mentioned above may be obtained by positioning a roller 84 between each of the end rollers and the roller located adjacent to the pivotal axis of the ramp.

The parallel rails 79 are spaced apart a distance just slightly less than that between the leg portions 76 of brackets 74 and the ramp 78 is pivotally mounted therebetween by means of bolts 87 passed through one of the apertures 77 in each bracket 74 and transversely aligned apertures (not shown) in rails 79 with bolts 87 being retained by nuts 88 in the usual manner.

The pivotal axis of the ramp 78 is located substantially nearer its rearward than its forward end with the ramp 78 being capable of assuming a substantially vertical position. It has been found convenient to have the length of the portion of the ramp extending forwardly of the pivotal axis approximately twice that of the portion extending rearwardly thereof to provide a longer lever arm forwardly of the axis. For use on trailers accommodating boats of lengths between 12 and 16 feet, it has been found quite satisfactory to install a ramp having 14 to 16 inches extending rearwardly of the pivotal axis and 28 to 36 inches extending forwardly thereof. The importance of this arrangement will be apparent from the description of the operation of the trailer which will appear later. When a boat has been loaded on a trailer, the portion of ramp 78 extending forwardly of the pivotal axis thereof will be received between the rails 62 of the parallel rail portion of twin boom structure 61, the offsetting of leg portions 75 of brackets 74 providing space for the projecting ends of roller mounting shafts 86.

If the trailer is loaded with a boat having a straight keel, the ramp 78 will be mounted with bolts 87 in the lowermost of the apertures 77 in each bracket 74 as shown in Fig. 1, and the rails 79 will rest on transverse member 2 with the rollers 84 of ramp 78 and the rollers 46 of boom 29 being in substantial alignment. However, if the trailer is loaded with a boat having a keel which is warped or formed so that it inclines upwardly at its rearward end toward the transom, an aperture 77 in each bracket 74 at a higher level will be selected for mounting the ramp 78 in accordance with the degree of this inclination. This is shown diagrammatically in Fig. 5 and it will be apparent that within limits, the ramp 78 may be pivoted so that it will be free floating to align itself with an upwardly inclined keel and provide firm support for the keel throughout its length. It is readily apparent, of course, that if the keel of the boat inclines downwardly at its rearward end toward the transom, the ramp 78 will be free floating when pivotally mounted at the lowest level to adjust itself to the conformation of the keel.

The running gear for the trailer may comprise a pair of wheels 89 freely rotatable on a rigid axle 91. The frame 1 is resiliently supported on the axle 91 by a conventional leaf spring 92 which is preferably preloaded by having its ends when at rest spaced apart a distance slightly less than that required for attachment to the inward ends of a pair of shackles 93 (only one of which is shown in the drawings) the outer ends of which are pivotally mounted on a pair of upstanding members 94 (of which again only one is shown in the drawings) which are rigidly secured to axle 91, one adjacent to each of the wheels 89. In this way, the spring 92 is stretched slightly when its ends are pivotally secured to the inward ends of shackles 93. The central arched portion of spring 92 is received between the leg portions 4 of transverse member 2 and bears against the underside of platform portion 3 thereof. The spring 92 is maintained firmly in place by a plate 96 drawn tightly up against its underside by bolts 97 extending through the platform portion 3 of transverse member 2 down along the sides of spring 92 and through the four corners of plate 96.

The running gear and frame of the trailer are interconnected by conventional radius rods 98 secured at their rearward ends in a manner not shown to the upright members 94 and at their forward ends to the boom 29 by a bolt 99 extending through one of a series of apertures 100. The forward ends of radius rods 98 will register with one of the apertures 100 in accordance with which one of the apertures 71 is employed for adjusting the twin boom structure 61 with respect to the transverse member 2.

If desired, fenders 101 may be mounted at the ends of transverse member 2 so as to overlie the wheels 89.

Now referring to the modified form of boat trailer illustrated by Figs. 6 and 7, it will be seen that while this form of trailer is of simpler and more economical construction, not being capable of transporting boats as heavy or of as wide a variation in lengths as the trailer just described, it nevertheless incorporates many of the same features and in the drawings, like parts will be given the same numbers.

The running gear for the present modified form of trailer may be identical with that of the trailer of Fig. 1 and will not again be described. The transverse member 2 may also be the same as the corresponding element of first-described trailer and rollers 6 are mounted on the transverse member 2 in the manner heretofore described.

However, in place of a boom construction which is adjustable in length, the trailer of Fig. 6 has a one-piece boom 106 which as shown in Fig. 7 may comprise a hollow rectangular beam. A bow rest 37 carrying a hand winch 42 is mounted for longitudinal adjustment adjacent to the forward end of boom 106 and this provides the only means for accommodating the present trailer to boats of different lengths. So that boats of different lengths will be correctly balanced, i. e., slightly bow heavy, the boom 106 is provided with a plurality of apertures 107 for securing the boom in adjusted position relative to the transverse member 2. For this purpose a bracket 108 is secured to the transverse member 2 intermediate its length as by welding and a bolt 109 extends through this bracket and the boom. As before, a portion of the boom 106 extends rearwardly of the transverse member 2.

The boom 106 is provided with a plurality of spaced keel guiding and supporting rollers 46 along its length forwardly of the transverse member 2 and adjacent to its forward end it is provided with a hitch device 34 and a ground rest 36.

At the rearward end of boom 106 there is pivotally mounted a lifting, loading and launching ramp 111. The ramp 111 has a longitudinal beam 112 which is a channel of inverted U-shape having a platform portion 113 and depending leg portions 114 which are spaced apart a distance greater than the width of boom 106 so that the ramp can be lowered on the boom with the lower surface of the platform portion 113 resting on the upper surface of the boom 106 and with sufficient clearance between leg portions 114 and the side walls of boom 106 to accommodate bracket 108 and any projecting portions of bolts 109.

The ramp 111 is provided with a transverse beam 82 carrying rollers 83 identical in construction and mounted in the same manner as were the corresponding rollers of the trailer of Fig. 1. The transverse beam 82 may be welded on the end of longitudinal beam 112 so that the upper surface of both beams lie in the same plane.

Keel guiding and supporting rollers 84 are positioned on the ramp 111 in the same spaced relation as the corresponding rollers of the form of trailer first described. They are however journaled in U-shaped brackets 116, all but one of which may be secured as by welding to the upper surface of the platform portion 113 of longitudinal beam 112 but with one of the brackets 116 secured as by welding to the upper side of transverse beam 82 so that the roller 84 supported thereby will be positioned as far rearwardly as possible.

As best shown in Fig. 7, the ramp 111 is pivotally mounted on the rearward end of boom 106 by passing a bolt 117 through aligned vertical slots 118 in leg portions 114 of the longitudinal beam 112 and apertures 119 in the boom 106 spaced slightly above the bottom wall thereof and as close to its rearward end as is possible and still maintain the required thickness of metal, the slots 118 providing for pivotal movement of the ramp 111 without binding on the boom 106.

Spacer members 121 are positioned on the bolt 117 between confronting faces of the leg portions 114 and side walls of the boom 106 to insure that these members are maintained in evenly spaced relation. A nut 122 is screwed home on the threaded end of bolt 117 in the usual manner.

The dimensioning, positioning of rollers and locating of the pivotal axis of the ramp 111 may be similar in the present modification of the invention as was the case with the trailer shown in Figs. 1–5.

Radius rods 98 are mounted, as before, between the axle and the boom 106.

The operation of the two forms of boat trailers constructed in accordance with the present invention is the same and boat loading operations have been shown diagrammatically in Figs. 8–13 of the drawing. Figs. 8–11 illustrate various stages of this operation when the boat may be loaded from a body of water having a gradually sloping bottom and beach. As shown, the trailer may be attached to the rear bumper of an automobile throughout the loading operation which may be carried out by one person.

If the bottom and beach are sufficiently firm, the car with trailer attached will be backed until the rear wheels of the trailer are partially submerged. Then the line 43 is trained over the most forwardly placed of the keel guiding and supporting rollers 84 of the pivotal ramp and the free end of the line is attached to the bow of a boat by engaging the hook 44 with a ring which will normally be found at or adjacent the boat's bow.

The boat is then drawn in until its bow contacts at least the most rearward of the rollers 84 and keeping the line 43 taut, the operator moves forwardly until he can operate the hand winch 42. Because of the close spacing of rollers 84 adjacent the rearward end of the ramp, at least two of the rollers 84 are quickly contacted by the bow of the boat, regardless of its configuration. Once this has been accomplished and the line 43 drawn taut, the boat will be maintained in alignment with the trailer even if there is a cross current in the body of water from which the boat is being loaded.

Figure 8:
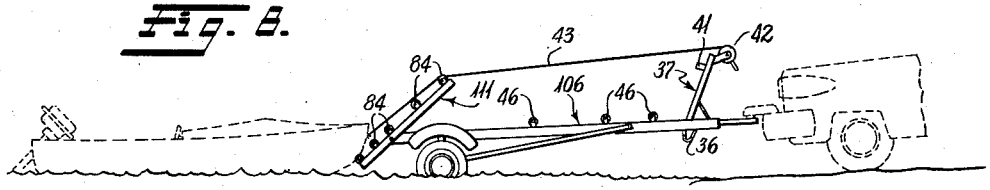
Figure 9:
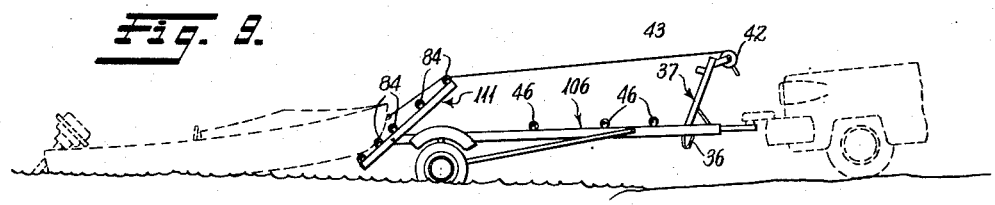
Figure 10:
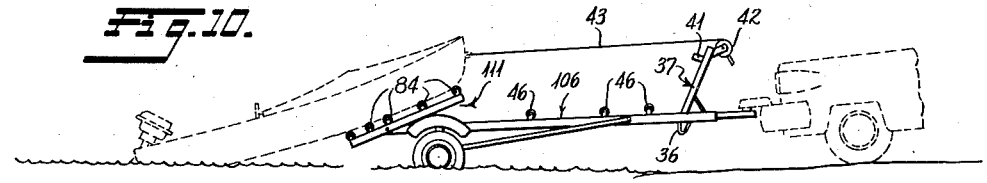
Figure 11:
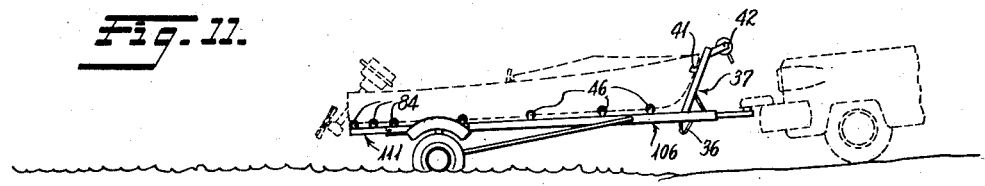

As the hand winch is turned, the boat gradually moves up the ramp with its keel being guided and supported by the rollers 84. Because of the longer lever arm existing forwardly of the pivotal axis of the ramp than exists rearwardly thereof, there is, with the line 43 trained over the forwardmost roller 84 a strong force exerted to rock the ramp in a downward direction, even though by far the greater portion of the boat is outboard of the ramp. This causes a lifting of the boat as a whole and causes the ramp to begin to tilt downwardly long before the boat being loaded has passed over its balance point, the force tending to lower the ramp continuing after the point of attachment of line 43 to the boat has advanced sufficiently to lift the line 43 free of the forwardmost roller 84. Also, it will be apparent that as soon as the bow of the boat contacts the roller 84 positioned just forwardly of the pivotal axis of the ramp, another force tending to lower the ramp is superimposed on that already present. When the balance point of the boat has been passed, the ramp assumes a substantially horizontal position and continued use of the winch 42 causes the boat to be drawn forwardly over the keel guiding and supporting rollers 46, located on the boom of the trailer, until the bow comes to rest with its nose supported in the V-shaped support 41 at which time the loading operation has been concluded, as shown in Fig. 11. The boat is preferably secured in place on the trailer by suitable means not shown.

During the loading operation, portions of the bottom of the boat spaced laterally from the keel will soon contact the rollers 83 so that as the boat is lifted from the water, it is stabilized and held in a horizontal position. Since the rollers 83 are mounted for rocking movement, they will follow the contour of the bottom of the boat as it changes toward the stern and thus maximum support is assured. The same action is obtained from the rollers 6 when the boat has been advanced sufficiently forwardly and the ramp has been tilted downward enough for contact of the bottom of the boat with these rollers.

When the loading operation has been completed, the keel of the boat is supported throughout its length by the rollers 46 and 84 and the bottom of the boat spaced laterally of the keel is supported on both sides amidship by the rollers 6 and directly under the transom by the rollers 83.

A boat launching operation is just the reverse of the loading operation and need not be described in detail. After manually moving a boat loaded on a trailer a slight distance rearwardly, it will continue in this direction of its own weight and must be restrained for gradual movement by means of the winch 42. With respect to a boat launching operation, however, it should be pointed out that because of the frictional resistance to rocking movement of the rollers 6 and 83, they will maintain the position which they have assumed when last contacted by the boat bottom on leaving the trailer and thus will be in a position to receive the boat bottom at the time of the next boat loading operation.

The loading of a boat over a substantially vertical bank or wall, as diagrammatically shown in Figs. 12 and 13, emphasizes the difference in the construction and operation of the tiltable ramp of a trailer manufactured in accordance with the present invention over that in which the ramp merely comprises a tilting platform, the major portion or an equal portion of which is located outboard of the trailer and merely forms an inclined plane up which an object to be loaded is drawn.

As shown in Figs. 12 and 13, a car may be backed so that the wheels of the trailer are closely adjacent to the vertical bank or wall. The overhang of the trailer frame places the tilting ramp far enough over the water that the line 43 may be trained over the rollers 84 and its free end attached to the bow of a boat as described earlier. Then on operation of the winch 42, the bow of the boat is first lifted vertically until contact with the lowermost roller 84 is effected. On continued turning of the winch, additional rollers 84 will be progressively contacted and the boat moved forwardly until eventually the ramp will be tilted to a substantially horizontal position and the boat drawn forward until it contacts the V-shaped support 41. Fig. 13 clearly shows the manner in which the lever action achieved by the the present construction has caused the ramp with a boat thereon to tilt forwardly long before the balance point of the boat has been passed and it will be seen that the boat has been lifted entirely clear of the water.

Having fully described the invention, we claim the following:

1. A boat trailer, comprising: a wheel supported frame having keel supporting means thereon and a winch positioned adjacent to the forward end thereof; and a ramp pivotally mounted on the rearward end of said frame on an axis extending transversely of said trailer, said ramp being mounted independently of the wheels supporting said frame and having the major portion of its length extending forwardly of said axis and having a plurality of keel guiding and supporting rollers mounted thereon, one at each end of said ramp, with said rollers being sufficiently closely spaced adjacent the rearward end of said ramp to prevent the bow of a boat directly contacting said rollers and being raised on said ramp by a line from said winch trained over the forwardmost of said rollers from hanging between adjacent rollers.

2. The boat trailer of claim 1 in which said frame extends a substantial distance beyond said wheels in a rearward direction.

3. A boat trailer, comprising: a transverse member; a wheel supported axle positioned below and substantially parallel with said transverse member; means interconnecting said transverse member and said axle; a boom structure secured to said transverse member substantially midway between its ends and disposed substantially normal thereto with the major portion of said boom structure extending forwardly of said transverse member but with a substantial portion extending rearwardly thereof, said boom structure having keel supporting and guiding means thereon and a winch positioned adjacent to the forward end thereof; and a ramp pivotally mounted on the rearward end of said boom structure independently of said wheel-supported axle on an axis extending transversely of said boom structure, said ramp having the major portion of its length extending forwardly of said axis and having a plurality of keel guiding and supporting rollers mounted thereon, one at each end of said ramp, with said rollers being sufficiently closely spaced adjacent the rearward end of said ramp to prevent the bow of a boat directly contacting said rollers and being raised on said ramp by a line from said winch trained over the forwardmost of said rollers from hanging between adjacent rollers.

4. The boat trailer of claim 3 in which one of said rollers is mounted on said ramp closely adjacent and forwardly of its pivotal axis.

5. A boat trailer, comprising: a transverse member, said transverse member having mounted thereon a pair of spaced, boat bottom contacting rollers, said rollers having their axes disposed generally longitudinally of said transverse member and being mounted for rocking movement on an axis disposed substantially transversely of said transverse member; a wheel supported axle positioned below and substantially parallel with said transverse member; means interconnecting said transverse member and said axle; a boom structure secured to said transverse member substantially midway between its ends and disposed substantially normal thereto with the major portion of said boom structure extending forwardly of said transverse member but with a substantial portion extending rearwardly thereof, said boom structure having keel supporting and guiding means thereon and a winch positioned adjacent to the forward end thereof; and a ramp pivotally mounted on the rearward end of said boom structure independently of said wheel-supported axle on an axis extending transversely of said boom structure, said ramp having the major portion of its length extending forwardly of said axis and having a transverse beam secured to the rearward end thereof, said beam having mounted thereon a pair of spaced, boat bottom contacting rollers having their axes disposed generally longitudinally of said transverse beam and being mounted for rocking movement on an axis disposed substantially transversely of said transverse beam, said ramp also having a plurality of keel guiding and supporting rollers mounted thereon, one at each end of said ramp, with said last-mentioned rollers being sufficiently closely spaced adjacent the rearward end of said ramp to prevent the bow of a boat directly contacting said rollers and being raised on said ramp by a line from said winch trained over the forwardmost of said rollers from hanging between adjacent rollers and with said spaced rollers on said transverse beam of said ramp stabilizing the boat and maintaining it in horizontal position.

6. The boat trailer of claim 1 in which the portion of said ramp extending forwardly of its pivotal axis is approximately twice that extending rearwardly thereof.

7. A boat trailer, comprising: a transverse member; a wheel supported axle positioned below and substantially parallel with said transverse member; means interconnecting said transverse member and said axle; a boom structure secured to said transverse member substantially midway between its ends and disposed substantially normal thereto with the major portion of said boom structure extending forwardly of said transverse member but with a substantial portion extending rearwardly thereof, said boom structure having keel supporting and guiding means thereon and a winch positioned adjacent to the forward end thereof, said boom structure having spaced substantially parallel rails at its rearward end, said parallel rails extending forwardly of said transverse member; and a ramp including a pair of parallel rails spaced apart a distance less than the distance between said parallel rails of said boom structure, said parallel rails of said ramp having mounted therebetween a plurality of keel guiding and supporting rollers, one at each end of said ramp, with the rollers being sufficiently closely spaced adjacent the rearward end of said ramp to prevent the bow of a boat being raised on said ramp by a line from said winch trained over the forwardmost of said rollers from hanging between adjacent rollers, said ramp being pivotally mounted independently of said wheel-supported axle at the rearward end of said boom structure between said rails of said structure on an axis extending transversely thereof with the major portion of said ramp extending forwardly of its pivotal axis, and with said ramp being capable of pivotal movement from a position of rest on said transverse member to a substantially vertical position.

8. The boat trailer of claim 7 in which the portion of said ramp extending forwardly of its pivotal axis is substantially twice that extending rearwardly thereof.

9. The boat trailer of claim 7 in which each of said keel guiding and supporting rollers is mounted on a shaft, the opposite ends of which are rotatably received in opposed apertures in said rails of said ramp.

10. The boat trailer of claim 7 in which one of said keel guiding and supporting rollers is located closely adjacent to and just forwardly of the pivotal axis of said ramp.

11. A boat trailer, comprising: a wheel supported frame having spaced keel supporting and guiding rollers mounted thereon at substantially the same level; a ramp having a plurality of spaced keel supporting and guiding rollers mounted thereon with one of said rollers positioned adjacent to each end of said ramp; means pivotally mounting said ramp independently of the wheels of said wheel-supported frame on the rearward end of said frame on an axis extending transversely of said trailer so that said ramp has a position of rest on said frame with said rollers on said ramp being in substantially horizontal alignment with said rollers on said frame to evenly support boats having a straight keel; and other means for pivotally mounting said ramp on the rearward end of said frame at a higher level to cause said ramp to be free floating to evenly support boats having a keel which inclines upwardly from the horizontal by establishing maximum contact therewith.

12. A boat trailer, comprising: a transverse member, said transverse member having mounted thereon a pair of spaced, boat bottom contacting rollers, said rollers having their axes disposed generally longitudinally of said transverse member and being mounted for rocking movement on an axis disposed substantially transversely of said transverse member; a wheel supported axle positioned below and substantially parallel with said transverse member; means interconnecting said transverse member and said axle; a boom secured at one end to said transverse member midway between its ends and extending forwardly normal to said transverse member with the upper surface of said boom lying in the same plane as the upper surface of said transverse member, said boom having a plurality of spaced keel supporting and guiding rollers mounted thereon and a bow rest and a winch mounted adjacent to the forward end of said boom, said bow rest being adjustable longitudinally of said boom; a twin boom structure having means providing for its mounting on said transverse member and said boom at a plurality of positions longitudinally of said boom to accommodate boats of different lengths in proper balance, said twin boom structure having a pair of spaced parallel rails at its rearward end, said parallel rails extending forwardly of said transverse member; and a ramp mounted independently of said wheel-supported axle and including a pair of parallel rails spaced apart a distance less than the distance between said parallel rails of said boom structure, said parallel rails of said ramp having mounted therebetween a plurality of keel guiding and supporting rollers, one at each end of said ramp, with the rollers being sufficiently closely spaced adjacent the rearward end of said ramp to prevent the bow of a boat being raised on said ramp by a line from said winch trained over the forwardmost of said rollers from hanging between adjacent rollers, said ramp being pivotally mounted at the rearward end of said boom structure between said rails of said structure on an axis extending transversely thereof with the major portion of said ramp extending forwardly of its pivotal axis, and with said ramp being capable of pivotal movement from a position of rest on said transverse member to a substantially vertical position, said ramp having a transverse beam secured to the rearward end thereof, said beam having mounted thereon a pair of spaced, boat bottom contacting rollers having their axes disposed generally longitudinally of said transverse beam and mounted for rocking movement on an axis disposed substantially transversely of said transverse beam, said last mentioned rollers stabilizing and holding a boat in horizontal position while it is being drawn onto said trailer and supporting the boat under its transom when loaded on the trailer.

13. A boat trailer, comprising: a wheel supported frame having keel supporting means thereon and a winch positioned adjacent to the forward end thereof, said frame including a beam of rectangular cross section extending longitudinally of said trailer; a ramp comprising a channel member having a platform portion and depending leg portions, said leg portions being spaced apart a distance greater than the width of said beam, said platform portion of said ramp having spaced keel guiding and supporting rollers mounted thereon, one at each end of said ramp, said ramp also having means to stabilize a boat being drawn thereover in direct contact therewith by a line from said winch; and means pivotally mounting said ramp independently of the wheels of said wheel-supported frame on the rearward end of said beam with said beam received between said depending leg portions of said channel member with the major portion of said ramp extending forwardly of its pivotal axis, said ramp having a position of rest with the platform portion of said channel member overlying the upper surface of said beam.

14. A boat trailer, comprising: a transverse member, said transverse member having mounted thereon a pair of spaced, boat bottom contacting rollers, said rollers having their axes disposed generally longitudinally of said transverse member and being mounted for rocking movement on an axis disposed substantially transversely of said transverse member; a wheel supported axle positioned below and substantially parallel with said transverse member; means interconnecting said transverse member and said axle; a boom of rectangular cross section having spaced, keel supporting and guiding rollers mounted thereon, and a bow rest and a winch mounted adjacent to the forward end of said boom, said bow rest being adjustable longitudinally of said boom for boats of different lengths; means for securing said boom on said transverse member normal thereto at a point midway between the ends of said transverse member at a plurality of positions along said boom to maintain proper balance of a boat loaded on said trailer; a ramp comprising a channel member having a platform portion and depending leg portions, said leg portions being spaced apart a distance greater than the width of said boom, said platform portion of said ramp having spaced, keel supporting and guiding rollers mounted thereon, one at each end of said ramp, said ramp having a transverse beam secured to the rearward end thereof, said transverse beam having mounted thereon a pair of spaced, boat bottom contacting rollers having their axes disposed generally longitudinally of said transverse beam and being mounted for rocking movement on an axis disposed substantially transversely of said transverse beam, said last mentioned rollers stabilizing a boat being drawn over said ramp and supporting a boat beneath its transom after it has been loaded on the trailer; and means pivotally mounting said ramp independently of said wheel-supported axle on the rearward end of said boom with said boom received between the said depending leg portions of said channel member with the major portion of said ramp extending forwardly of its pivotal axis, said ramp having a position of rest with the platform portion of said channel member overlying the upper surface of said boom.

15. A lifting, loading and launching ramp adapted to be mounted on the rearward end of a wheeled boat trailer, comprising: a pair of spaced parallel rails; a plurality of keel guiding and supporting rollers mounted between said rail members, one at each end of said ramp, with the rollers being sufficiently closely spaced adjacent to the rearward end of said ramp to prevent the bow of a boat being raised on said ramp in direct contact therewith from hanging between adjacent rollers; a transverse beam secured to the rearward end of said rails, said beam having mounted thereon a pair of spaced, boat bottom contacting rollers having their axes disposed generally longitudinally of said transverse beam, each of said last-mentioned rollers being mounted for rocking movement on an axis disposed transversely of said transverse beam; and means for mounting said ramp on said trailer independently of the wheels of said trailer with the major portion of the length of said ramp extending forwardly of its pivotal axis.

16. A lifting, loading and launching ramp adapted to be mounted at the rearward end of a wheeled boat trailer having a longitudinal beam of rectangular cross section, comprising: a channel member having a platform portion and depending leg portions; a transverse beam secured to the rearward end of said channel member, said transverse beam having mounted thereon a pair of spaced, boat bottom contacting rollers having their axes extending generally longitudinally of said transverse beam and being mounted for rocking movement on an axis disposed substantially transversely of said transverse beam, said rollers being adapted to stabilize a boat drawn over said ramp in direct contact therewith; keel supporting and guiding rollers mounted on the upper side of said ramp at spaced points thereon, with one of said last-mentioned rollers at each end of said ramp; and means for pivotally mounting said ramp independently of the wheels of said trailer at the rearward end of the rectangular beam with the major portion of the length of said ramp extending forwardly of the pivotal axis.

17. A boat trailer, comprising: a wheel supported frame having keel supporting means thereon and a winch positioned adjacent to the forward end thereof; and a ramp pivotally mounted on the rearward end of said frame on an axis extending transversely of said trailer, said ramp being mounted independently of the wheels supporting said frame and having the major portion of its length extending forwardly of said axis and having a plurality of keel guiding and supporting rollers mounted thereon, one at each end of said ramp and one of said plurality of rollers being mounted closely adjacent and forwardly of the pivotal axis of said ramp.

18. A lifting, loading and launching ramp adapted to be mounted on the rearward end of a wheeled boat trailer, comprising: a pair of spaced parallel rails; a plurality of keel guiding and supporting rollers mounted between said rail members, one at each end of said ramp; a transverse beam secured to the rearward end of said rails, said beam having mounted thereon a pair of spaced, boat bottom contacting rollers having their axes disposed generally longitudinally of said transverse beam, each of said last-mentioned rollers being mounted for rocking movement on an axis disposed transversely of said transverse beam; and means for mounting said ramp on said trailer independently of the wheels of said trailer with the major portion of the length of said ramp extending forwardly of its pivotal axis, one of said plurality of keel guiding and supporting rollers being mounted on said ramp closely adjacent to and forwardly of the pivotal axis of said ramp.

References Cited in the file of this patent
UNITED STATES PATENTS

| | | | |
|---|---|---|---|
| 1,538,052 | Mueller | May 19, | 1925 |
| 1,658,770 | Murray et al. | Feb. 7, | 1925 |
| 2,676,716 | Sallis | Apr. 27, | 1954 |
| 2,691,534 | Sampsell | Oct. 12, | 1954 |
| 2,700,480 | Triplett | Jan. 25, | 1955 |
| 2,708,045 | Shontz | May 10, | 1955 |
| 2,716,499 | Grant | Aug. 30, | 1955 |
| 2,733,823 | Evans | Feb. 7, | 1956 |
| 2,741,383 | Leckert | Apr. 10, | 1956 |
| 2,754,017 | Hart et al. | July 10, | 1956 |
| 2,765,941 | Mamo | Oct. 9, | 1956 |
| 2,789,713 | Agricola | Apr. 13, | 1957 |